Figure 1:
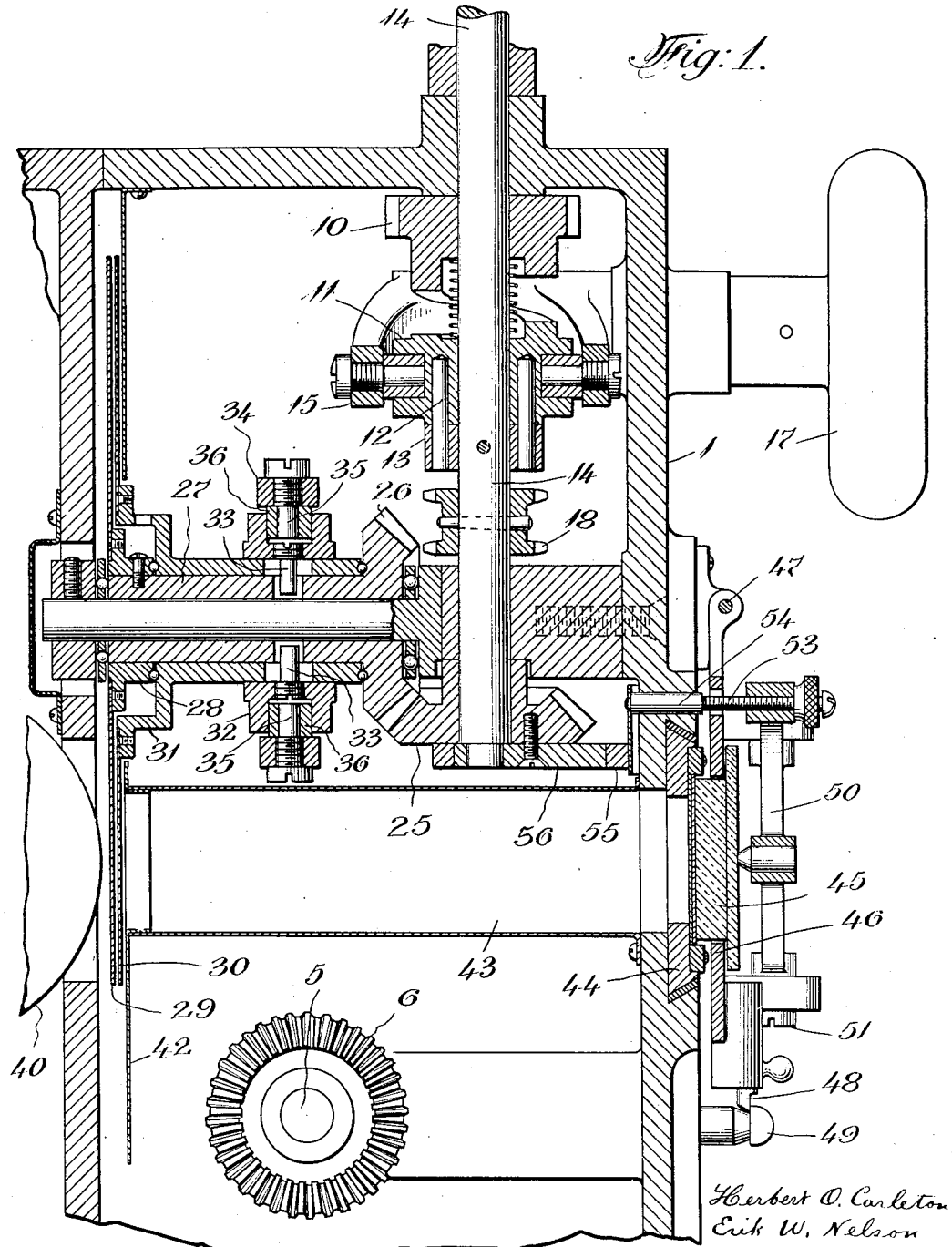

H. O. CARLETON & E. W. NELSON.
SHUTTER FOR MOTION PICTURE MACHINES.
APPLICATION FILED MAY 14, 1914.

1,119,924.

Patented Dec. 8, 1914.
3 SHEETS—SHEET 1.

Witnesses:
John J. Kittel
Robert G. Clark

Herbert O. Carleton
Erik W. Nelson
Inventors

By their Attorney Lewis J. Doolittle

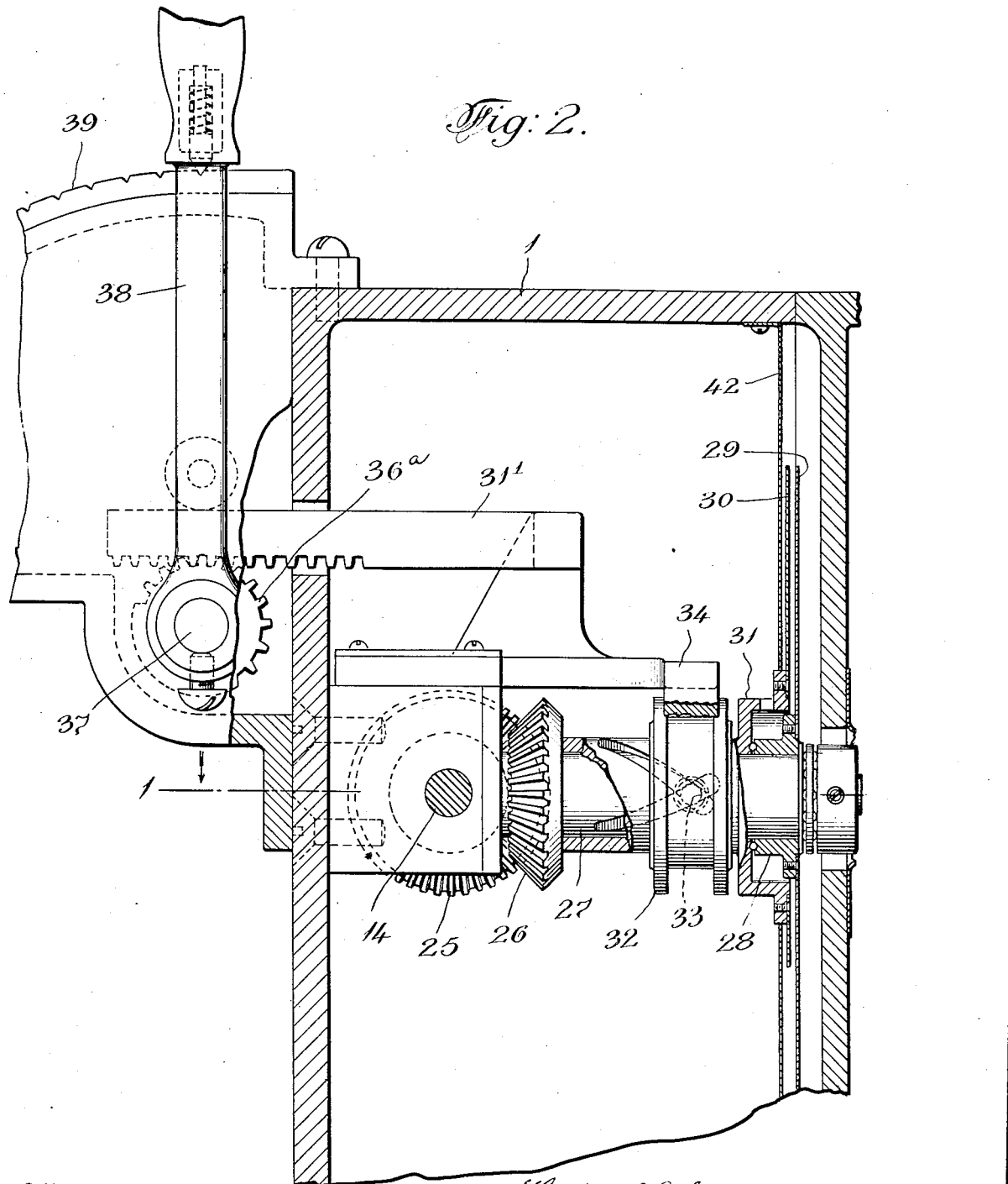

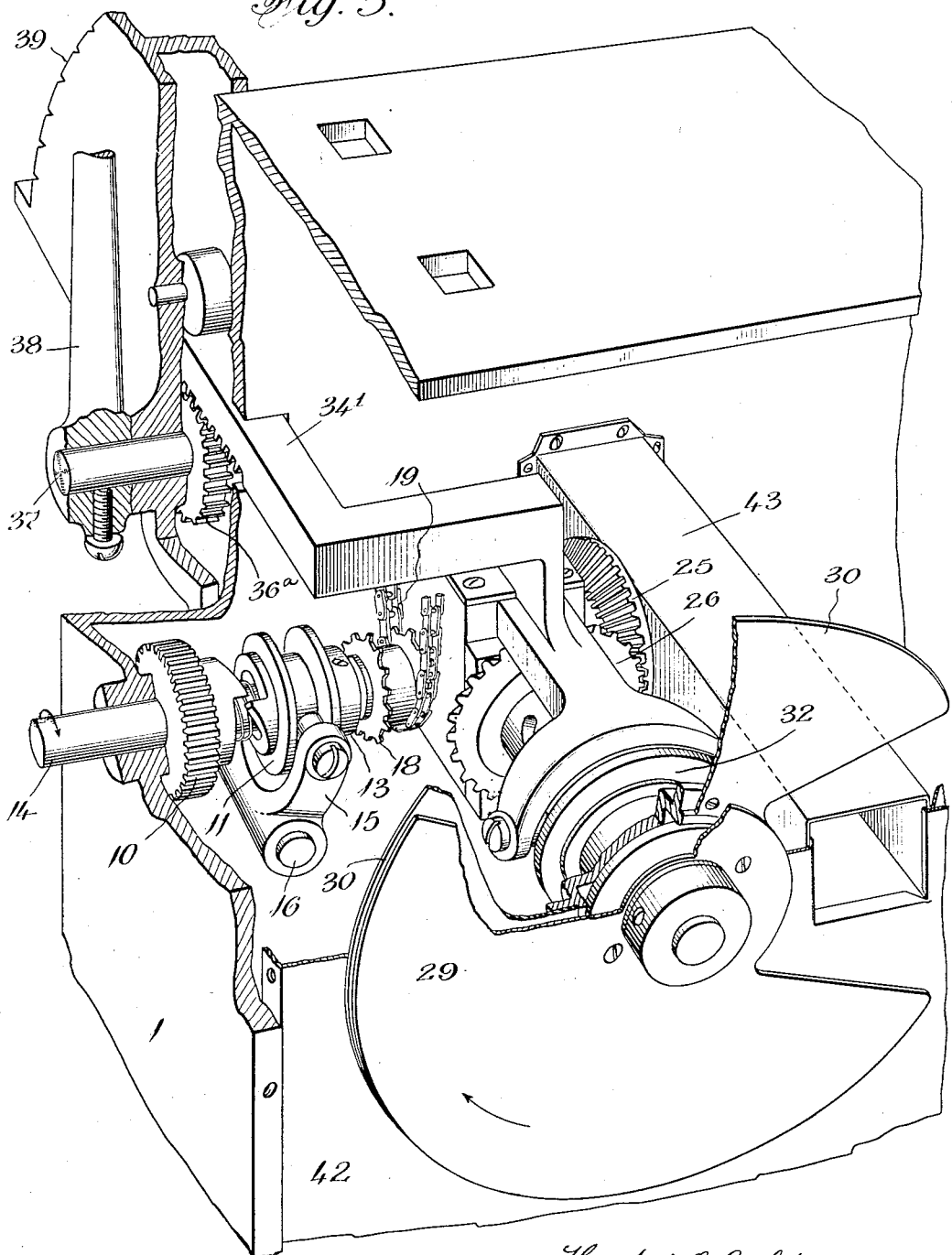

UNITED STATES PATENT OFFICE.

HERBERT O. CARLETON, OF NEW YORK, AND ERIK WILLIAM NELSON, OF NEW ROCHELLE, NEW YORK.

SHUTTER FOR MOTION-PICTURE MACHINES.

1,119,924.  Specification of Letters Patent.  Patented Dec. 8, 1914.

Original application filed October 23, 1913, Serial No. 796,881. Divided and this application filed May 14, 1914. Serial No. 838,474.

*To all whom it may concern:*

Be it known that we, HERBERT O. CARLETON, a citizen of the United States, and a resident of the city of New York, borough of Brooklyn, county of Kings, and State of New York, and ERIK W. NELSON, a citizen of the United States, and resident of New Rochelle, Westchester county, and State of New York, have invented certain new and useful Improvements in Shutters for Motion-Picture Machines, of which the following is a specification.

This invention relates to a motion picture machine and more particularly to a shutter construction adapted for use with the same.

This application is a division of the application filed by us on October 23, 1913, under Serial No. 796,881.

The object of the invention is to provide a simple and efficient shutter construction provided with means for adjusting the same while in operation.

The features of the construction illustrating the invention as shown in the accompanying drawings will appear more fully hereinafter in connection with the description of the same.

In the drawings like parts in the several views have been given the same reference numerals, the parts and reference numerals corresponding to those shown in our parent application above referred to.

Figure 1 is a sectional plan view of the operating mechanism. Fig. 2 is a sectional side elevation. Fig. 3 is a perspective view taken from a point in front of the upper left hand corner of Fig. 1 or the upper right hand corner of Fig. 2.

A frame or housing is shown at 1, in which the operating mechanism is mounted. A vertical shaft 5 is driven by a suitable motor and carries a bevel gear 6 which drives a shaft carrying a gear meshing with the clutch gear 10. The clutch gear 10 is provided with a clutch on one face adapted to be engaged by the clutch member 11, which is operatively connected by means of the pins 12 to a collar 13 attached to the shaft 14. The gear 10 is mounted to rotate upon the shaft 14 and the clutch member 11 is slidably mounted upon this same shaft. The pins 12 carried by the collar 13 extend into the clutch member 11, which is moved into and out of its operative position by means of the yoke 15 mounted on the shaft 16 and turned by means of the handle 17.

Referring to Fig. 1, a beveled gear 25 mounted on the shaft 14 rotates the beveled gear 26, which is provided with a long sleeve or extension 27 upon which a hub or collar 28 is mounted and to which one of the shutters 29 is attached and rotated thereby. A second portion of the shutter 30 is mounted upon a hub or sleeve 31 and both portions of the shutter are rotated by means of the collar 32 and the pins 33 attached thereto and which project through slots in the sleeves 31 and 27. (See Figs. 1, 2 and 3). A sliding yoke 34 extends on either side of the collar 32 and the pins 35 are mounted thereupon which carry rollers 36 in an annular recess in the collar 32, by means of which the collar 32 is moved longitudinally upon the sleeve 31. (See Figs. 2 and 3).

A gear $36^a$ mounted on the shaft 37 is operated by the handle lever 38, which is provided with a suitable locating attachment operating in notches in the segment 39. The gear $36^a$ engages with a rack on an extension 34' from the yoke 34, by means of which the yoke is moved longitudinally. The longitudinal movement of the yoke 34 moves the collar 32 carrying the pins 33 which project into the slots in the sleeves 27 and 31. (See Figs. 1 and 2). These slots extend at different angles curving around the axis of the sleeves, as shown in Fig. 2, and the longitudinal movement of the pins 33 in these slots rotates the sleeves 27 and 31 carrying the shutters 29 and 30 in opposite directions, thus regulating the amount of opening and time of exposure to the light. Any suitable source of light, such as the electric incandescent bulb 40, is positioned in the light box upon the rear of the casing 1. A light shield 42 in the casing 1 protects the film from the light except at the point where it is desired to expose the same. For this purpose a light tube 43, shown in Figs. 1 and 3, permits the light to pass to the front of the machine as the open portions of the shutter pass between it and the light. At the front of the machine in front of the light tube 43 a film guide 44 is mounted and is provided with an opening corresponding to the size of the pictures. This opening is covered on the outside by a suitably colored glass 45, the films passing between the guide 44 and the glass 45. The glass 45 is carried in a hinged frame 46, which is hinged to the casing 1 at 47, as shown in Fig. 1, and is provided with a latch 48 engaging the latch post 49 at its opposite side. A hinged member 50, hinged at 51, is provided with a projecting pin which holds the glass 45 against the films. This insures a sharp reproduction of the picture.

As many changes could be made in the above construction and many apparently widely different embodiments of our invention designed without departing from the scope of the appended claims, we intend that all matter contained in the above description or shown in the accompanying drawings shall be interpreted as illustrative merely of an operative embodiment of our invention and not in a limiting sense.

What we claim is:—

1. A shutter adapted for use in photographic apparatus to control the exposure, said shutter comprising a pair of coöperating disks each mounted upon a sleeve provided with angular slots, a collar slidably mounted upon one of said sleeves and provided with pins engaging in said slots adapted to cause said disks to rotate together and to move the disks relatively to each other to regulate the light opening therethrough when said collar is moved longitudinally upon the sleeve, and means for moving said collar.

2. A shutter adapted for use in photographic apparatus to control the exposure, said shutter comprising a pair of coöperating disks each mounted upon a sleeve provided with angular slots, a collar slidably mounted upon one of said sleeves and provided with pins engaging in said slots adapted to cause said disks to rotate together and to move the disks relatively to each other to regulate the light opening therethrough when said collar is moved longitudinally upon the sleeve, and means adapted to operate while the disks are in rotation to move said collar longitudinally.

3. A shutter adapted for use in photographic apparatus to control the exposure, said shutter comprising a pair of coöperating disks each mounted upon a sleeve provided with angular slots, a collar slidably mounted upon one of said sleeves and provided with pins engaging in said slots adapted to cause said disks to rotate together and to move the disks relatively to each other to regulate the light opening therethrough when said collar is moved longitudinally upon the sleeve, and a movable yoke engaging said collar and adapted to be operated while the disks are in rotation to move said collar longitudinally.

Signed at New York city, in the county and State of New York, this 1st day of May, 1914.

HERBERT O. CARLETON.
ERIK WILLIAM NELSON.

Witnesses:
ALBERT E. JOHNSON,
LEWIS J. DOOLITTLE.